US009630092B2

(12) United States Patent
Yamaguchi et al.

(10) Patent No.: US 9,630,092 B2
(45) Date of Patent: Apr. 25, 2017

(54) GAME PROGRAM AND INFORMATION PROCESSING DEVICE

(71) Applicant: DeNA Co., Ltd., Tokyo (JP)

(72) Inventors: Kyohei Yamaguchi, Tokyo (JP); Takashi Hanabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/657,040

(22) Filed: Mar. 13, 2015

(65) Prior Publication Data

US 2015/0265918 A1    Sep. 24, 2015

(30) Foreign Application Priority Data

Mar. 19, 2014    (JP) .................................. 2014-056384

(51) Int. Cl.
A63F 13/00    (2014.01)

(52) U.S. Cl.
CPC .................... *A63F 13/00* (2013.01)

(58) Field of Classification Search
None
See application file for complete search history.

(56) References Cited

U.S. PATENT DOCUMENTS

| 8,827,788 B2* | 9/2014 | Takagi | A63F 13/35 463/1 |
| 2004/0162136 A1* | 8/2004 | Yamato | A63F 13/10 463/29 |
| 2006/0205462 A1* | 9/2006 | Bentz | A63F 13/10 463/2 |
| 2008/0234038 A1* | 9/2008 | Jiao | G06Q 30/02 463/25 |
| 2012/0064969 A1* | 3/2012 | Uchibori | A63F 13/12 463/29 |
| 2012/0283014 A1* | 11/2012 | Van Luchene | A63F 13/12 463/31 |
| 2014/0121026 A1* | 5/2014 | Hashimoto | A63F 13/12 463/42 |

FOREIGN PATENT DOCUMENTS

| JP | 2007-167307 A | 7/2007 |
| JP | 2009-233098 A | 10/2009 |
| JP | 5091073 B | 4/2010 |
| JP | 2010-136882 A | 6/2010 |
| JP | 5409876 B | 5/2014 |

* cited by examiner

*Primary Examiner* — Jason Skaarup

(74) *Attorney, Agent, or Firm* — Procopio, Cory, Hargreaves & Savitch LLP

(57) ABSTRACT

The game program according to the present invention directs a computer to execute a process in which a player unit that is selected on a game field by a player is moved on the game field in response to the player's operations and is engaged in battle with an enemy unit at the destination, and a process in which a rental unit selected from a unit list by the player is engaged in battle with an enemy unit on the game field without being moved on the game field.

5 Claims, 13 Drawing Sheets

FIG. 3

| Card ID | Character Name | Official Position | Maximum Level | Attack Strength | Defense Strength | Hit Points | Mental Strength |
|---|---|---|---|---|---|---|---|
| 0001 | AAAA | King | 100 | 100 | 100 | 100 | 100 |
| 0002 | BBBB | General | 80 | 170 | 120 | 150 | 150 |
| ⋮ | ⋮ | ⋮ | ⋮ | ⋮ | ⋮ | ⋮ | ⋮ |
| 0010 | DDDD | Chief Military Advisor | 60 | 20 | 50 | 30 | 250 |
| ⋮ | ⋮ | ⋮ | ⋮ | ⋮ | ⋮ | ⋮ | ⋮ |

FIG. 4

| Player ID | Friend Player ID | Game Points | Rental Card Information | Deck Information |
|---|---|---|---|---|
| 1 | 5, 8 | 15 | Rental Card Information (1) | Deck Information (1) |
| 2 | None | 6 | Rental Card Information (2) | Deck Information (2) |
| 3 | 4, 6 | 50 | Rental Card Information (3) | Deck Information (3) |
| 4 | 3, 6 | 90 | Rental Card Information (4) | Deck Information (4) |
| 5 | 1, 6 | 40 | Rental Card Information (5) | Deck Information (5) |
| 6 | 3, 4, 5 | 30 | Rental Card Information (6) | Deck Information (6) |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

FIG. 5

| | | | Proprietary Card Information (2) | | |
|---|---|---|---|---|---|
| Proprietary Card Information (1) | | | | | |
| Card ID | Level | Attack Strength | Defense Strength | Hit Points | Mental Strength |
| 0001 | 12 | 350 | 350 | 350 | 350 |
| 0003 | 8 | 780 | 690 | 850 | 85 |
| 0015 | 15 | 360 | 480 | 420 | 260 |
| ⋮ | ⋮ | ⋮ | ⋮ | ⋮ | ⋮ |

FIG. 6

| | | Deck Information (3) | | | | | |
|---|---|---|---|---|---|---|---|
| | | Deck Information (2) | | | | | |
| | | Deck Information (1) | | | | | |
| First Deck (Deck ID: 0001) | Leader | Card ID | Level | Attack Strength | Defense Strength | Hit Points | Mental Strength |
| | ○ | 0001 | 8 | 350 | 350 | 350 | 350 |
| | — | 0027 | 10 | 270 | 360 | 310 | 170 |
| | | ⋮ | ⋮ | ⋮ | ⋮ | ⋮ | ⋮ |
| | Comprehensive fighting strength | | 20 | 1530 | 1800 | 1590 | 1440 |
| Second Deck (Deck ID: 0002) | Leader | Card ID | Level | Attack Strength | Defense Strength | Hit Points | Mental Strength |
| | ○ | 0003 | 15 | 780 | 680 | 850 | 85 |
| | — | 0019 | 8 | 210 | 360 | 420 | 230 |
| | | ⋮ | ⋮ | ⋮ | ⋮ | ⋮ | ⋮ |
| | Comprehensive fighting strength | | 20 | 1710 | 1660 | 1820 | 1380 |
| Third Deck (Deck ID: 0003) | Leader | Card ID | Level | Attack Strength | Defense Strength | Hit Points | Mental Strength |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

FIG. 7

| Game Field (2) | | | |
|---|---|---|---|
| Game Field (1) | | | |
| Area ID | Player ID | Deck ID | Enemy Deck ID |
| 1 | — | — | — |
| 2 | — | — | — |
| 3 | — | — | 001 |
| ⋮ | ⋮ | ⋮ | ⋮ |

FIG. 8

| List No. | Friend Player ID | Deck ID |
|---|---|---|
| 1 | 0201 | 002 |
| 2 | 0105 | 001 |
| 3 | 0023 | 006 |
| ⋮ | ⋮ | ⋮ |

GAME PROGRAM AND INFORMATION PROCESSING DEVICE

This application claims the benefit of foreign priority under 35 USC 119(a) based on Japanese Patent Application No. 2014-056384, filed Mar. 19, 2014, the contents of which is incorporated herein by reference in its entirety.

BACKGROUND

1. Technical Field

The present invention relates to a game program and an information processing device.

2. Related Art

Game programs are known that are used to direct a computer to conduct a battle game, in which characters that a player has borrowed from another player (rental characters) engage in battle with enemy characters (for example, see Patent Document 1).

PRIOR ART LITERATURE

Patent Literature

[Patent Document 1]
Japanese Patent Publication No. 5091073

SUMMARY

These game programs lacked strategic nuance because there was no difference between the tactics a player could employ in situations in which rental characters were engaged in battle with enemy characters, and situations in which their own characters, which were not rental characters, were engaged in battle with enemy characters.

The present invention has been devised with these circumstances in mind and it is an object of the invention to provide enhanced strategic nuance in a battle game with integrated rental functionality.

The main aspect of the present invention aimed at solving the above-mentioned problems is a game program (e.g., non-transitory computer readable medium having machine-executable instructions with which a computer having a storage and a hardware processor connected via a network to a terminal device operated by a player) that directs a computer to conduct a battle game involving player units owned by a player and opponent enemy units that engage in battle while moving on a game field, wherein the computer is directed to carry out:

a first screen generation process for generating a game screen including the game field, on which the player units and enemy units are located;

a first unit selection process for allowing the player to select a player unit to be used in battle on the game field while the game field is displayed on the game screen;

a first battle process which, after moving the player unit selected by the player on the game field in response to the player's operations, engages the player unit in battle with an enemy unit at the destination;

a second screen generation process for generating a game screen including a unit list providing a list view of rental units that the player can borrow;

a second unit selection process for allowing the player to select a rental unit to be used in battle from the unit list while the unit list is displayed on the game screen; and a second battle process which, without moving the rental unit selected by the player on the game field, engages the rental unit in battle with an enemy unit located on the game field.

Other features of the present invention will become apparent from this Description and the accompanying drawings.

BRIEF DESCRIPTION OF THE DRAWINGS

FIG. 3
A diagram showing an example data structure of the card information.

FIG. 4
A diagram illustrating an example data structure of the player information.

FIG. 5
A diagram showing an example data structure of the proprietary card information.

FIG. 6
A diagram showing an example data structure of the deck information.

FIG. 7
A diagram illustrating an example data structure of the game field information.

FIG. 8
A diagram illustrating an example data structure of the list information.

DETAILED DESCRIPTION

Figure 1:
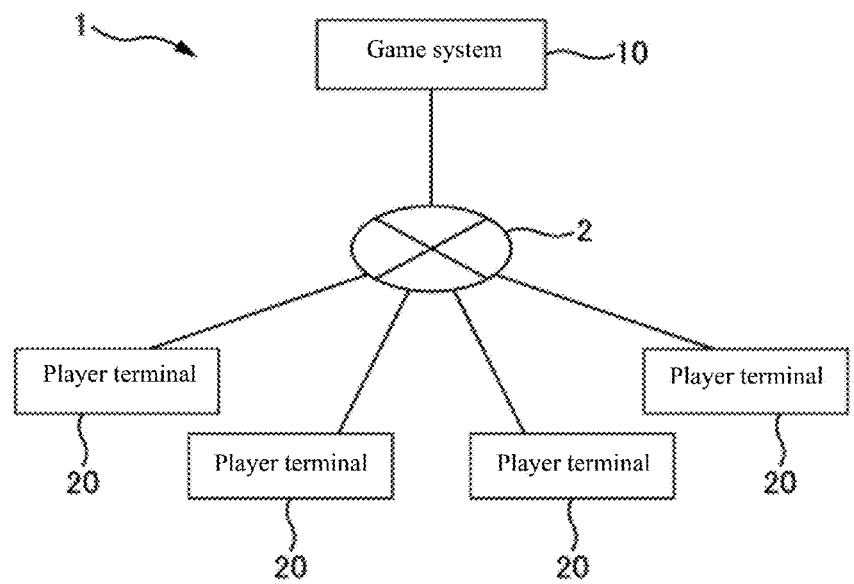
FIG. 1
A diagram illustrating an example overall configuration of the game system 1.

At least the following will be apparent from this Description and the accompanying drawings.

Namely, this is a game program (e.g., non-transitory computer readable medium having machine-executable instructions with which a computer having a storage and a hardware processor connected via a network to a terminal device operated by a player) that directs a computer to conduct a battle game involving player units owned by a player and opponent enemy units that engage in battle while moving on a game field, wherein the computer is directed to carry out:

a first screen generation process for generating a game screen including the game field, on which the player units and enemy units are located;

a first unit selection process for allowing the player to select a player unit to be used in battle on the game field while the game field is displayed on the game screen;

a first battle process which, after moving the player unit selected by the player on the game field in response to the player's operations, engages the player unit in battle with an enemy unit at the destination;

a second screen generation process for generating a game screen including a unit list providing a list view of rental units that the player can borrow;

a second unit selection process for allowing the player to select a rental unit to be used in battle from the unit list while the unit list is displayed on the game screen; and a second battle process which, without moving the rental unit selected by the player on the game field, engages the rental unit in battle with an enemy unit located on the game field.

Such a game program makes it possible to provide enhanced strategic nuance in a battle game with integrated rental functionality because it allows for tactics to be varied depending on whether a player unit is engaged in battle with an enemy unit or a rental unit is engaged in battle with an enemy unit.

The second unit selection process may be adapted to authorize the selection of the rental units by the player if a predetermined condition is met.

Such a game program can minimize the misuse of rental units in battles with enemy units.

The predetermined condition may be at least one condition selected from conditions related to the player, conditions related to the game field, and conditions related to the rental units.

Such a game program can limit the misuse of rental units in battles with enemy units depending on the game situation.

The second screen generation process may be adapted to provide a list view of friend units belonging to friend players associated with the player as rental units in the unit list, and the second unit selection process may be adapted to restrict the selection of the friend units by the player based on the frequency of selection with which the friend units have been selected.

In accordance with such a game program, renting units belonging to friend players encourages communication with other players, and, at the same time, makes it possible to reduce biased communication since specific friend units may not be rented over and over again.

The program (e.g., non-transitory computer readable medium having machine-executable instructions with which a computer having a storage and a hardware processor connected via a network to a terminal device operated by a player) may be also adapted to direct the computer to execute a reward provision process, during which a reward is provided to friend players who own friend units when said friend units are selected as rental units by the player during the second unit selection process.

Such a game program makes more lively communication possible between the players.

Furthermore, this is an information processing device for conducting a battle game involving player units owned by a player and opponent enemy units that engage in battle while moving on a game field, wherein the device is provided with:

a first screen generation processing module for generating a game screen including the game field, on which the player units and enemy units are located;

a first unit selection processing module for allowing the player to select a player unit to be used in battle on the game field while the game field is displayed on the game screen;

a first battle processing module which, after moving the player unit selected by the player on the game field in response to the player's operations, engages said player unit in battle with an enemy unit located at the destination;

a second screen generation processing module for generating a game screen including a unit list providing a list view of rental units that the player can borrow;

a second unit selection processing module for allowing the player to select a rental unit to be used in battle from the unit list while the unit list is displayed on the game screen; and a second battle processing module which, without moving the rental unit selected by the player on the game field, engages said rental unit in battle with an enemy unit located on the game field.

Such an information processing device makes it possible to provide enhanced strategic nuance in a rental-enabled battle game.

Embodiments

<<Configuration of Game System 1>>

FIG. 1 is a diagram illustrating an example overall configuration of the game system 1. The game system 1 provides a variety of game-related services to players over a network 2 (for example, the Internet, etc.), and includes a server device 10 and multiple player terminals 20.

The game system 1 according to the present embodiment can provide the player with a battle game conducted using game content. A battle-type card game played using character cards, as an example of game content, will be discussed below.

The battle-type card game of the present embodiment is a battle game in which multiple decks, as an example of units, are located on a game field having multiple unit areas and said multiple decks engage in deck-on-deck battles while moving between the respective unit areas. In this battle game, decks assembled by the player (hereinafter referred to as "player decks") and decks assembled by opponents (other players or the computer) (hereinafter referred to as "enemy decks") are repeatedly moved in an alternating manner and a battle is initiated when two of them meet in a destination unit area. In this battle game, during a battle, the player can use not only the player's own deck, but also rental decks that can be borrowed from other players.

<<Configuration of Server Device 10>>

Figure 2:
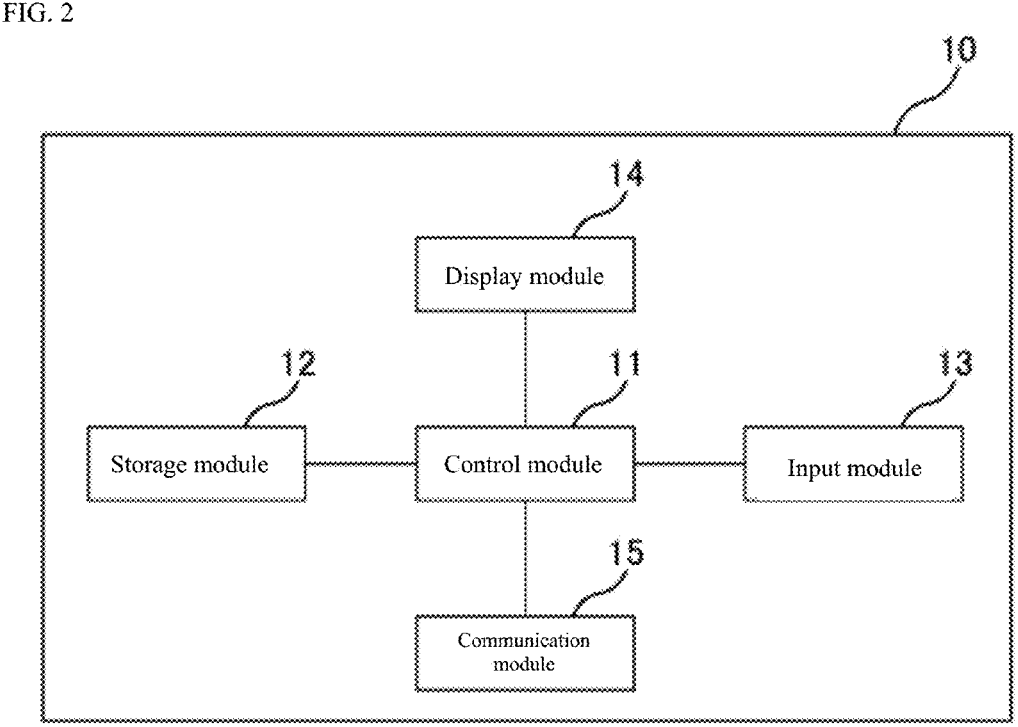
FIG. 2
A block diagram illustrating the functional configuration of the server device 10.

FIG. 2 is a block diagram illustrating the functional configuration of the server device 10. The server device 10 is an information processing device (for example, a workstation, a personal computer, or the like) used when a system administrator, etc., operates and manages a variety of services. The server device 10 has a terminal control module 11, which provides overall control of the server device 10, a storage module 12, which stores a variety of data and software programs (e.g., non-transitory computer readable medium having machine-executable instructions with which a computer having a storage and a hardware processor connected via a network to a terminal device operated by a player), an input module 13, which is used by the system administrator for entering various types of data, a display module 14, which displays operation screens, and a communication module 15, which communicates information to and from the player terminals 20.

In the present embodiment, the storage module 12 stores a variety of data, such as card information (i.e. character card-related information), player information (i.e. player-related information), game field information (i.e. game field-related information), list information (i.e. deck list-related information), and the like.

FIG. 3 is a diagram illustrating an example data structure of the card information. The card information has configured therein, in conjunction with card IDs, the initial values of various parameters such as, at least, character name, official position, and maximum level, as well as attack strength, defense strength, hit points, mental strength, and the like.

FIG. 4 is a diagram illustrating an example data structure of player information. The player information has configured therein, in conjunction with player IDs, such as, at least, friend player IDs, game points (for example, virtual currency), proprietary card information (i.e. information relating to the character cards that belong to the player, hereinafter referred to as "proprietary cards"), and deck information (i.e. information relating to the decks assembled by the player), and the like.

FIG. 5 is a diagram illustrating an example data structure of the proprietary card information. The proprietary card information has configured therein, in conjunction with the card IDs of the proprietary cards, the current values of various parameters such as, at least, level, attack strength, defense strength, hit points, mental strength, and the like.

FIG. 6 is a diagram illustrating an example data structure of the deck information. The deck information has configured therein a variety of information regarding each of the multiple decks assembled from the player's own multiple proprietary cards.

FIG. 7 is a diagram illustrating an example data structure of the game field information. The game field information has configured therein, in conjunction with the area IDs of the unit areas, the decks (player decks, enemy decks) located in each unit area on the game field.

FIG. 8 is a diagram illustrating an example data structure of the list information. The list information has configured therein, in conjunction with list numbers, friend decks assembled from the multiple character cards belonging to friend players. The friend decks are provided in the deck list as rental decks that the player can borrow.

<<Configuration of Player Terminal 20>>

Figure 9:
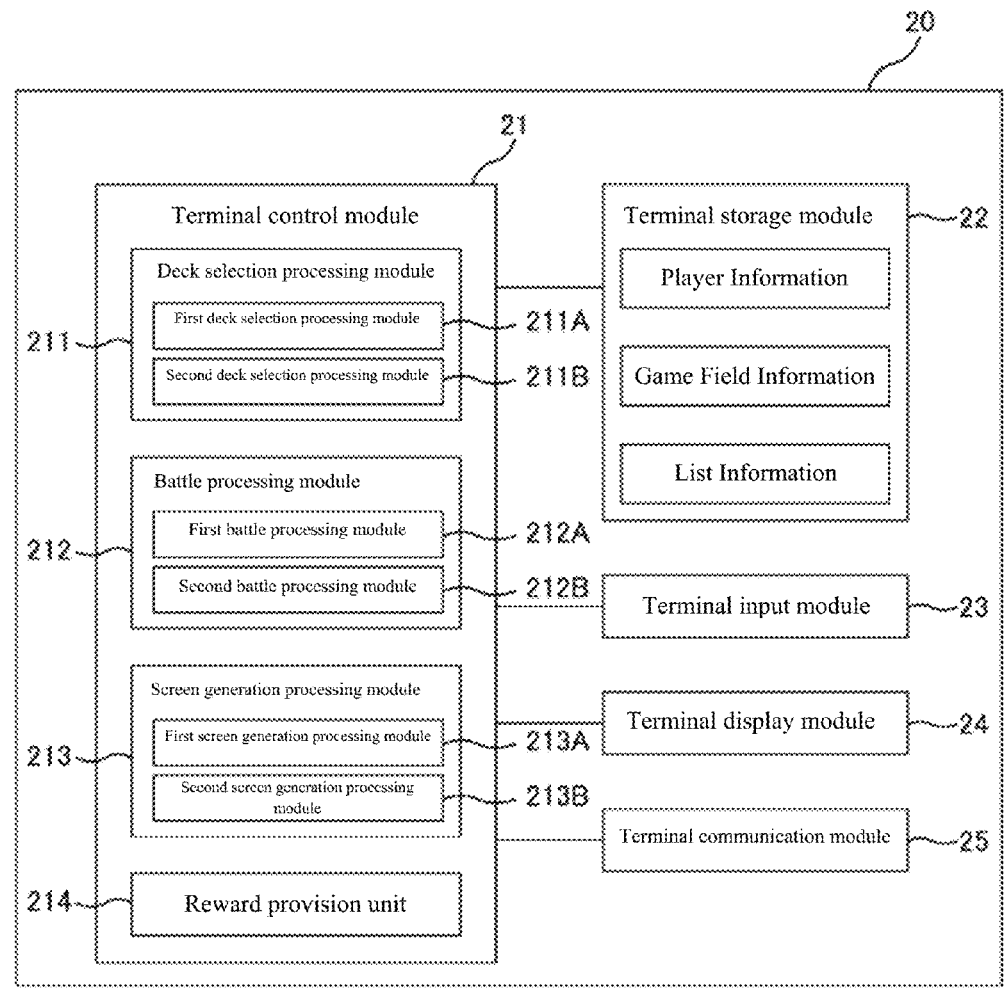
FIG. 9
A block diagram illustrating the functional configuration of the player terminal 20.

FIG. 9 is a block diagram illustrating a functional configuration of the player terminal 20. In the present embodiment, the player terminals 20, which are the information processing devices that the players use when playing games (e.g., mobile phone terminals, smartphones, tablet-type terminals, etc.), are connected to permit transmission and reception of various types of game-related information (game data, etc.) between them and the server device 10. This player terminal 20 has a terminal control module 21, a terminal storage module 22, a terminal input module 23, a terminal display module 24, and a terminal communication module 25.

The terminal control module 21, along with forwarding data between the modules, exercises overall control over the player terminal 20 and is implemented using a CPU (Central Processing Unit) that runs a predetermined program (e.g., non-transitory computer readable medium having machine-executable instructions with which a computer having a storage and a hardware processor connected via a network to a terminal device operated by a player) stored in memory. The terminal control module 21 according to the present embodiment is provided with, at least, a deck selection processing module 211, a battle processing module 212, a screen generation processing module 213, and a reward provision module 214.

The deck selection processing module 211, which is an example of a unit selection processing module, possesses functionality to carry out processing required to enable the player to select an arbitrary deck from among multiple decks. This deck selection processing module 211 has a first deck selection processing module 211A and a second deck selection processing module 211B. When the game field is displayed on the game screen and the first deck selection processing module 211A receives operation input from the player, whereby an arbitrary deck is selected in the game field, said module determines the deck to be manipulated in response to this operation performed by the player. When the deck list is displayed on the game screen and the second deck selection processing module 211B receives operation input from the player, whereby an arbitrary deck is selected from the deck list, said module determines the deck to be manipulated in response to this operation performed by the player.

The battle processing unit 212 possesses the functionality to carry out processing required to progress through a battle game in accordance with the game program (e.g., non-transitory computer readable medium having machine-executable instructions with which a computer having a storage and a hardware processor connected via a network to a terminal device operated by a player). This battle processing module 212 has a first battle processing module 212A and a second battle processing module 212B. The first battle processing module 212A executes a process in which, after moving the player deck on the game field in response to the player's operations, the deck is engaged in battle with an enemy deck at the destination. The second battle processing module 212B executes a process in which a rental deck is engaged in battle with an enemy deck on the game field without moving the rental deck on the game field in response to the player's operations.

The screen generation processing module 213 possesses functionality to carry out processing for generating screen data used to display a game screen on the terminal display unit 24. This screen generation processing module 213 has a first screen generation processing module 213A and a second screen generation processing module 213B. The first screen generation processing module 213A carries out processing to generate a game screen used to display battles between a player deck and an enemy deck. The second screen generation processing module 213B carries out processing to generate a game screen used to display battles between a rental deck and an enemy deck.

The reward provision module 214 possesses functionality to execute processing used to provide rewards to the players. According to this embodiment, if a player's own deck is rented out to another player, the reward provision module 214 executes processing to provide a reward to the player who owns the rental deck.

The terminal storage module 22, which is connected to the terminal control module 21 across a bus, carries out processing for looking up, reading out, and re-writing stored data in response to commands from the terminal control module 21. This terminal storage module 22 (implemented, for example, in the form of a flash memory or a hard disk, etc.) stores, at least, the player information, game field information, list information, and the like downloaded from the server device 10.

The terminal input module 23, which is used by the player to perform various operations (game operations, etc.), is implemented, for example, in the form of control buttons, a touch panel, or the like.

The terminal display module 24, which is used to display a game screen in response to a command from the terminal control module 21, is implemented, for example, in the form a liquid crystal display (LCD: Liquid Crystal Display) or the like.

The terminal communication module 25, which operates as a transceiver unit for transmitting and receiving various types of information to and from the server device 10 over a network 2, is implemented, for example, as an NIC (Network Interface Card) or the like.

<<Operation of Player Terminals 20>>

An example of operation of the player terminals 20 will be discussed below. The player terminals 20 according to this embodiment operate differently depending on whether a player deck is engaged in battle with an enemy deck, or a rental deck is engaged in battle with an enemy deck. Each type of operation will be described in specific detail below.

<Battles between Player Decks and Enemy Decks>

Figure 10:
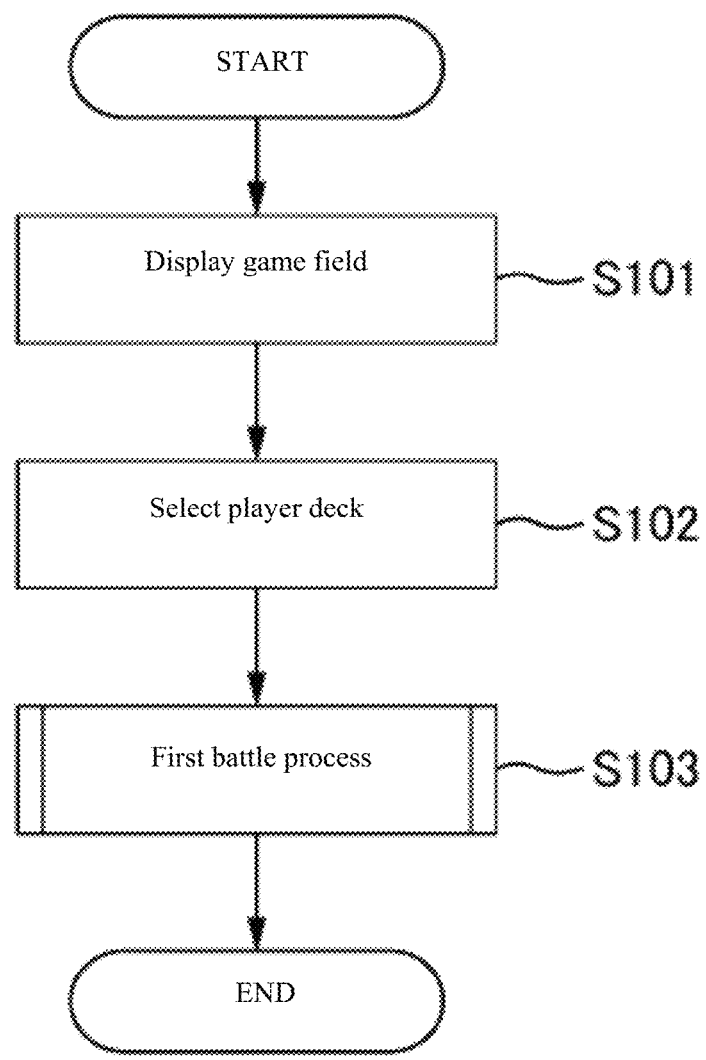
FIG. 10
A flow chart used to illustrate an example of operation in a situation where a player deck and an enemy deck are engaged in battle.

FIG. 10 is a flow chart used to illustrate an example of operation in a situation where a player deck and an enemy deck are engaged in battle.

First, in response to the player's operations, the player terminal 20 directs the first screen generation processing module 213A to generate a game screen including a game field and displays this game screen on the terminal display module 24 (S101). Specifically, the first screen generation processing module 213A uses the game field information illustrated in FIG. 7 to generate a game screen including a game field, where player decks and enemy decks are located.

Figure 11:
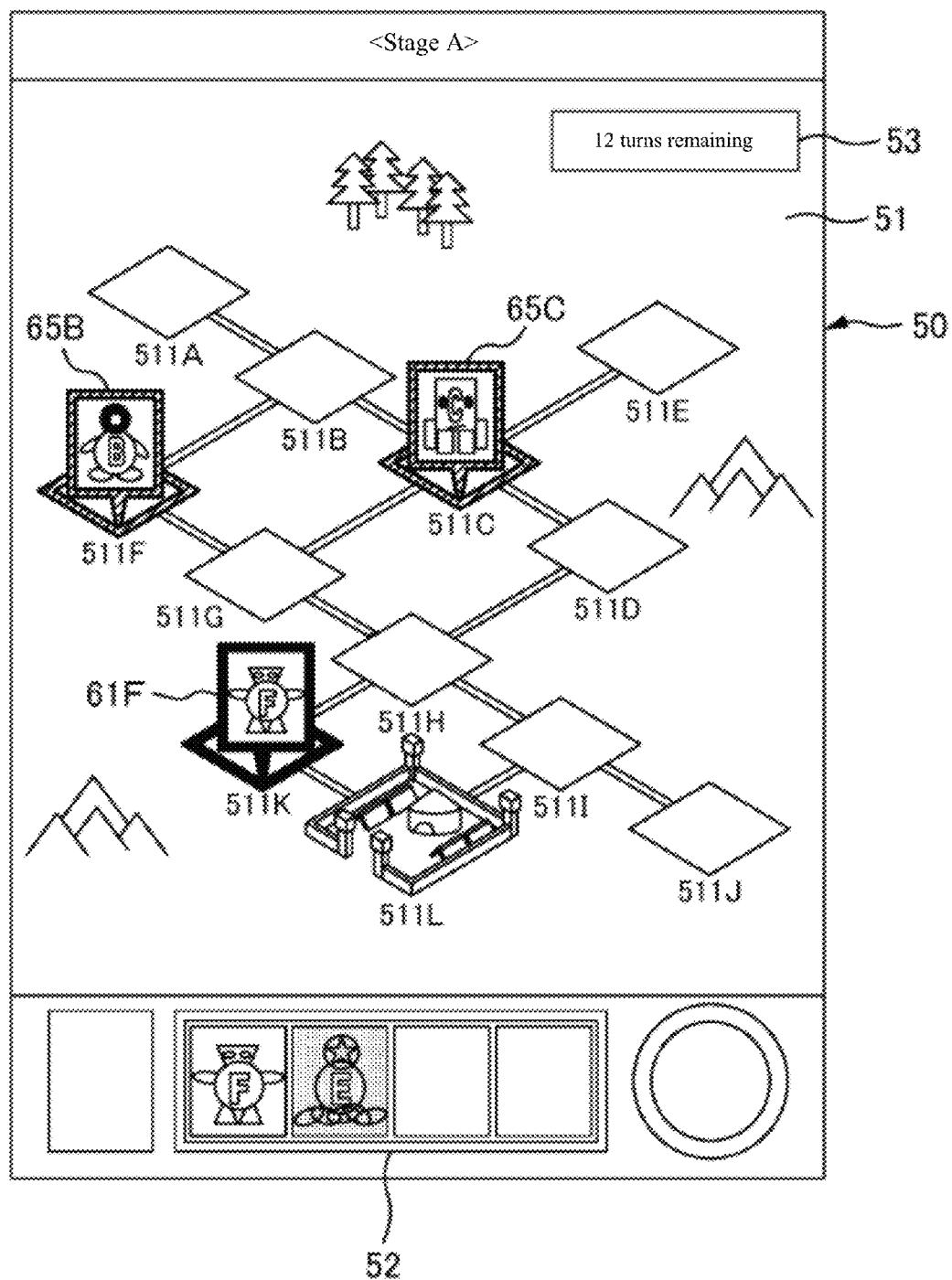
FIG. 11
A diagram illustrating an example of a game screen 50 including a game field.

FIG. 11 is a diagram illustrating an example of a game screen 50 including a game field. A game field 51, a deck status display area 52, the number of turns remaining 53, multiple unit areas 511A to 511L, player deck 61F, and enemy decks 65B, 65C are displayed on the game screen 50. On the game field 51, player deck 61F is located in unit area 511K, enemy deck 65B is located in unit area 511F, and enemy deck 65C is located in unit area 511C. The deck status display area 52 displays the status of the player deck 61F, indicating whether it is in a battle-enabled state or a battle-disabled state. The number of turns remaining 53 indicates the number of times the player deck 61F on the game field 51 can move, which is decremented by 1 each time the player moves the player deck 61F. In addition, each time the number of turns remaining is decremented, a skill point is awarded to the player. By using the skill points, the player can activate skills useful in a battle (inflicting damage on an enemy deck, stopping an enemy deck at a predetermined turn, etc.).

After that, looking back at FIG. 10, when the game screen 50 illustrated in FIG. 11 is displayed on the terminal display module 24, the first deck selection processing module 211A allows the player to select a player deck 61F to be used in battle from the multiple decks on the game field 51 (S102). It should be noted that as far as the method of selecting the player deck 61F to be used in battle is concerned, a method may be used, in which the player is allowed to select the player deck 61F itself and, in addition, a method may be used, in which the player is allowed to select the unit area, to which the player deck 61F is moved.

After that, the first battle processing module 212A executes a first battle process intended to engage the player deck 61F selected by the player in battle with the enemy decks 65B, 65C on the game field (S103). The first battle process will be described in specific detail below.

Figure 12:
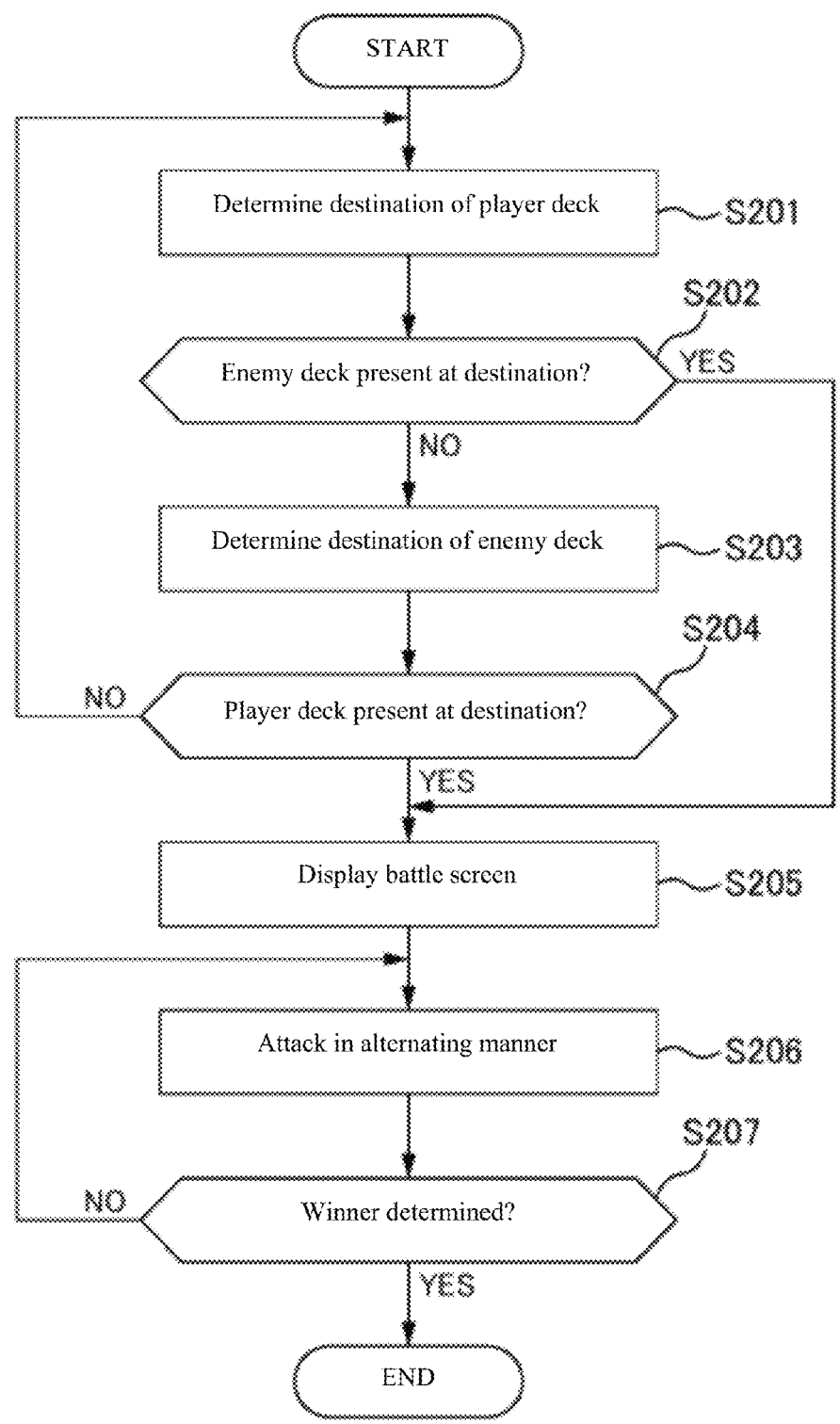
FIG. 12
A flow chart used to illustrate the first battle process.

FIG. 12 is a flow chart used to illustrate the first battle process.

First, in response to the player's operations, the first battle processing module 212A moves the player deck 61F located in the unit area 511K to the destination unit area indicated by the player (S201). At such time, the game field information illustrated in FIG. 7 is updated based on the unit area where the player deck is located after the move. In addition, the number of turns remaining, which is decremented by 1 as a result of this move, is updated and recorded in the terminal storage module 22.

Next, the first battle processing module 212A uses this game field information to determine whether or not an opponent enemy deck is located in the destination unit area of the player deck 61F (S202).

Then, if an enemy deck is located in the destination unit area (S202: YES), the procedure advances to Step S205, and a battle is initiated. On the other hand, if no enemy decks are located there (S202: NO), the destination unit areas of the enemy decks 65B, 65C are determined (S203). At such time, the game field information illustrated in FIG. 7 is updated based on the unit areas where the enemy decks are located after the move.

Next, the first battle processing module 212A uses this game field information to determine whether or not opponent player decks are located in the destination unit areas of the enemy decks 65B, 65C (S204).

Then, if a player deck is located in a destination unit area (S204: YES), the procedure advances to Step S205 and a battle is initiated. On the other hand, if no player decks are located there (S204: NO), the procedure goes back to Step S201 and the subsequent processing is repeated.

At Step S205, the player terminal 20 directs the first screen generation processing module 213A to generate a game screen including a battle field for the player deck and an enemy deck and display this game screen on the terminal display module 24. Specifically, the first screen generation processing module 213A uses the deck information illustrated in FIG. 6 to generate a game screen used to conduct battles between character cards constituting a player deck and character cards constituting an enemy deck.

Figure 13:
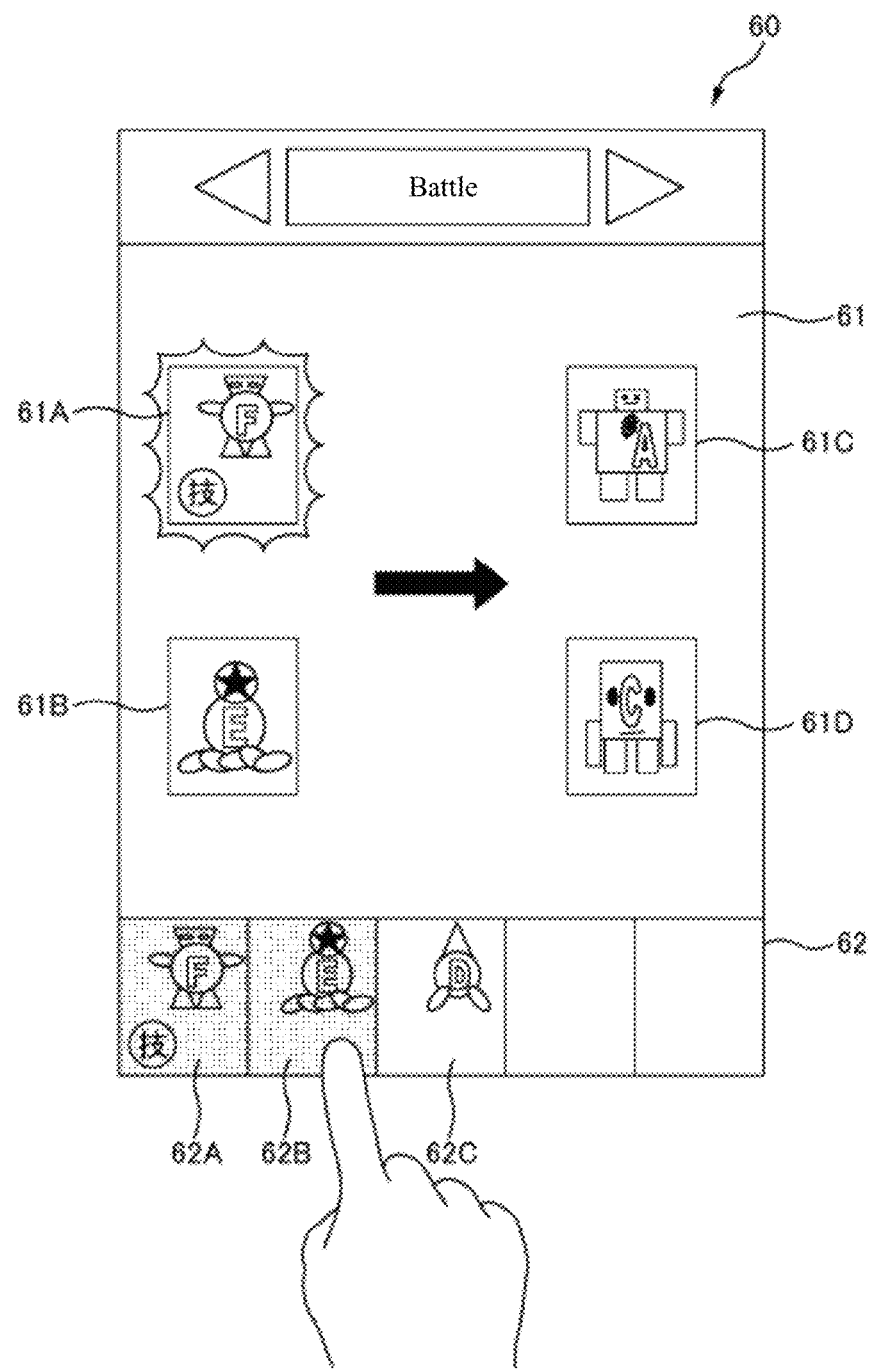
FIG. 13
A diagram illustrating an example of a game screen 60 including a battle field.

FIG. 13 is a diagram illustrating an example of a game screen 60 including a battle field. A battlefield 61, a deck-forming card display area 62, player characters 61A, 61B, and enemy characters 61C, 61D are displayed on the game screen 60. Multiple player characters 62A-62C forming a player deck are displayed side-by-side in the deck-forming card display area 62. It is shown that, on the battlefield 61, the player characters 61A, 61B, which have been selected by the player from among the player characters arranged side-by-side in the deck-forming card display area 62, are engaged in battle with the enemy characters 61C, 61D, which constitute an enemy deck.

Next, the first battle processing module 212A directs each of the player characters 61A, 61B and enemy characters 61C, 61D to attack their respective opponents in an alternating manner (S206). At such time, the magnitude of the attack strength, etc. of each character is determined based on the card information illustrated in FIG. 3 or proprietary card information illustrated in FIG. 6.

Next, the first battle processing module 212A determines whether or not a winner has been determined by the mutual attacks between the player characters 61A, 61B and enemy characters 61C, 61D (S207). The winner is determined based on who is the first to bring the opponent's hit point parameter below a predetermined value.

Then, if the winner has been determined (S207: YES), this process is terminated, and if the winner has not been determined (S207: NO), the procedure goes back to Step S206 and the mutual attack process is repeated.

After that, looking back at FIG. 10, once the winner in the battle of the player deck and the enemy deck is determined in this manner, the process is terminated.

<Battles between Rental Deck and Enemy Decks>

Figure 14:
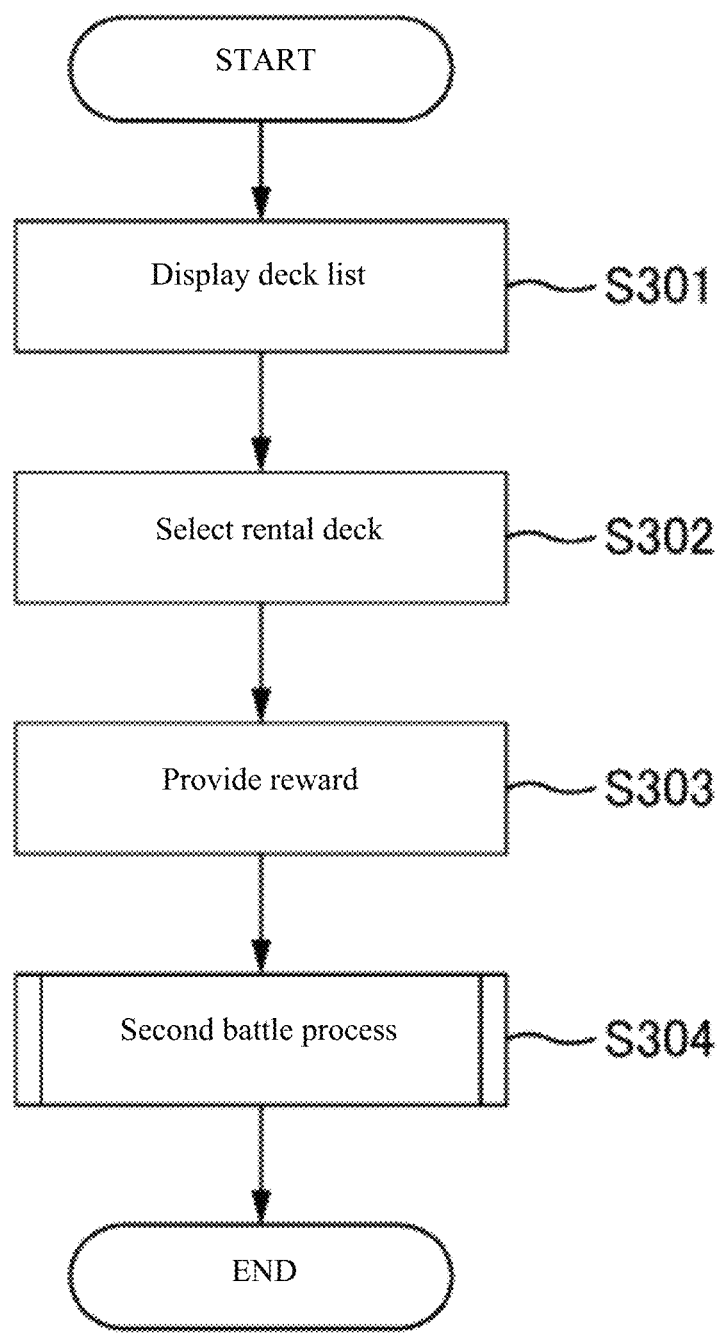
FIG. 14
A flow chart used to illustrate an example of operation in a situation where a rental deck and an enemy deck are engaged in battle.

FIG. 14 is a flow chart used to illustrate an example of operation in a situation where a rental deck and an enemy deck are engaged in battle.

First, in response to the player's operations, the player terminal 20 directs the second screen generation processing module 213B to generate a game screen including a deck list and display this game screen on the terminal display module 24 (S301). Specifically, the second screen generation processing module 213B uses the list information illustrated in FIG. 8 to generate a game screen including a deck list, where the rental decks that the player can borrow from other players are displayed.

Figure 15:
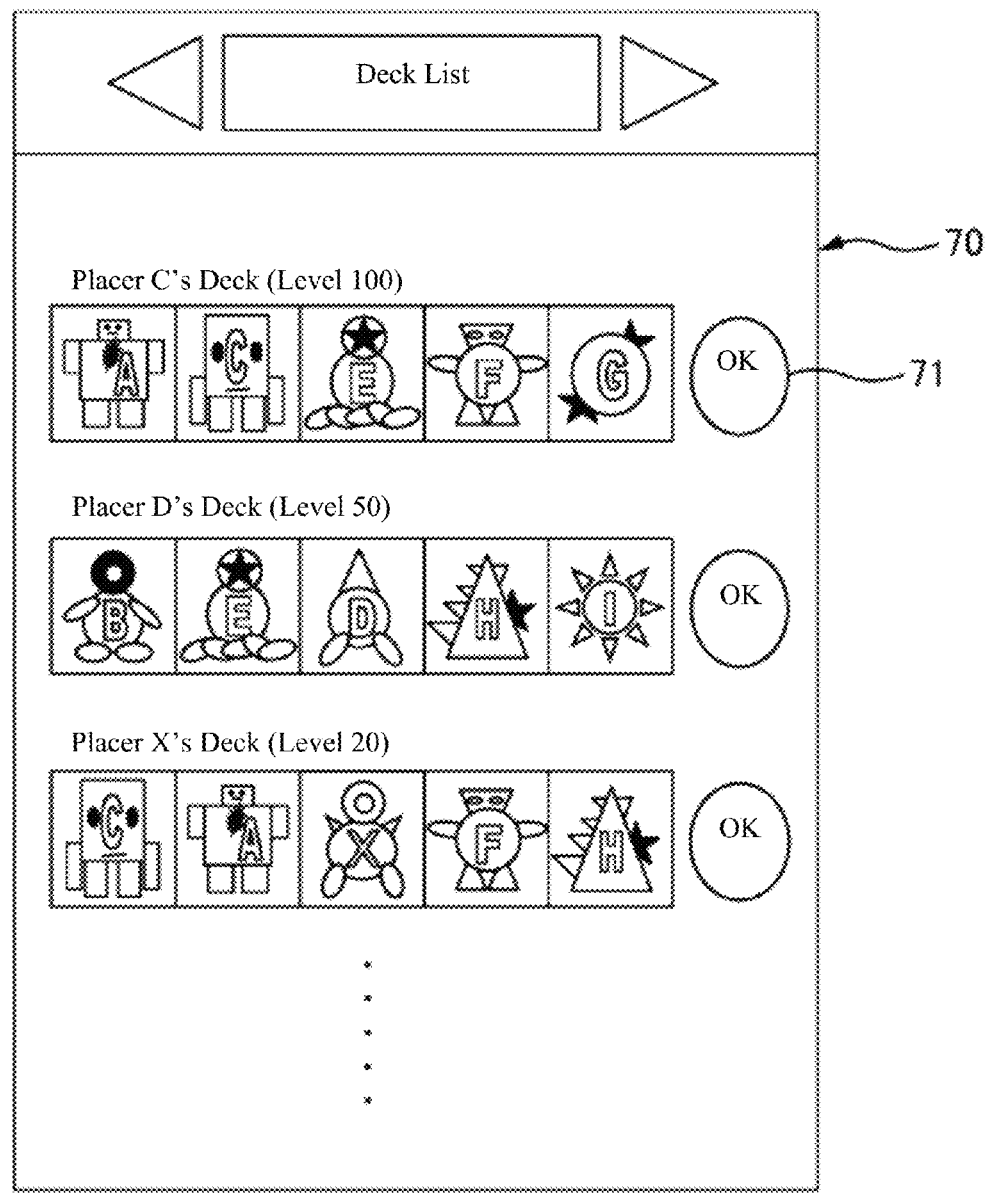
FIG. 15
A diagram illustrating an example of a game screen 70 including a deck list.

FIG. 15 is a diagram illustrating an example of a game screen 70 including a deck list. Friend decks belonging to friend players associated with the player are listed on the game screen 70 as rental decks that the player can borrow. The player can borrow the friend decks as rental decks by selecting the control buttons 71, which are provided for each friend deck.

After that, looking back at FIG. 14, when the game screen 70 illustrated in FIG. 15 is displayed on the terminal display module 24, the second deck selection processing module 211B allows the player to select a rental deck (friend deck) to be used in battle from the multiple decks in the deck list (S302).

At such time, the second deck selection processing module 211B authorizes rental deck selection by the player only if a predetermined condition is met. Specifically, the second deck selection processing module 211B reads out a selection frequency for a friend deck, with which said deck has been selected as a rental deck, from the terminal storage module 22 and determines whether or not this selection frequency is at or above a predetermined frequency (for example, once or more). If, as a result of such determination, it is found that the frequency of selection does not exceed the predetermined frequency, the selection of the rental deck (friend deck) by the player is authorized. For this reason, there is a chance that if the player selects the highest level rental deck (a strong rental deck) from the deck list during the current battle, it may not be possible to select the rental deck again during the next battle. Therefore, the player needs to select the rental deck from the deck list by taking the strength of the enemy deck, the battle sequence, and other game circumstances into consideration.

After that, when the rental deck is selected from the deck list in this manner, the reward provision module 214 executes a process that provides a reward to the friend player who owns the rental deck for renting his or her own deck to another player (S303). In the present embodiment, as an example of reward, the friend player is given game points. At such time, the friend player's player information (see FIG. 4) is updated.

After that, the second battle processing module 212B executes a second battle process intended to engage the rental deck selected by the player in battle with the enemy decks on the game field (S304). The second battle process will be described in specific detail below.

Figure 16:
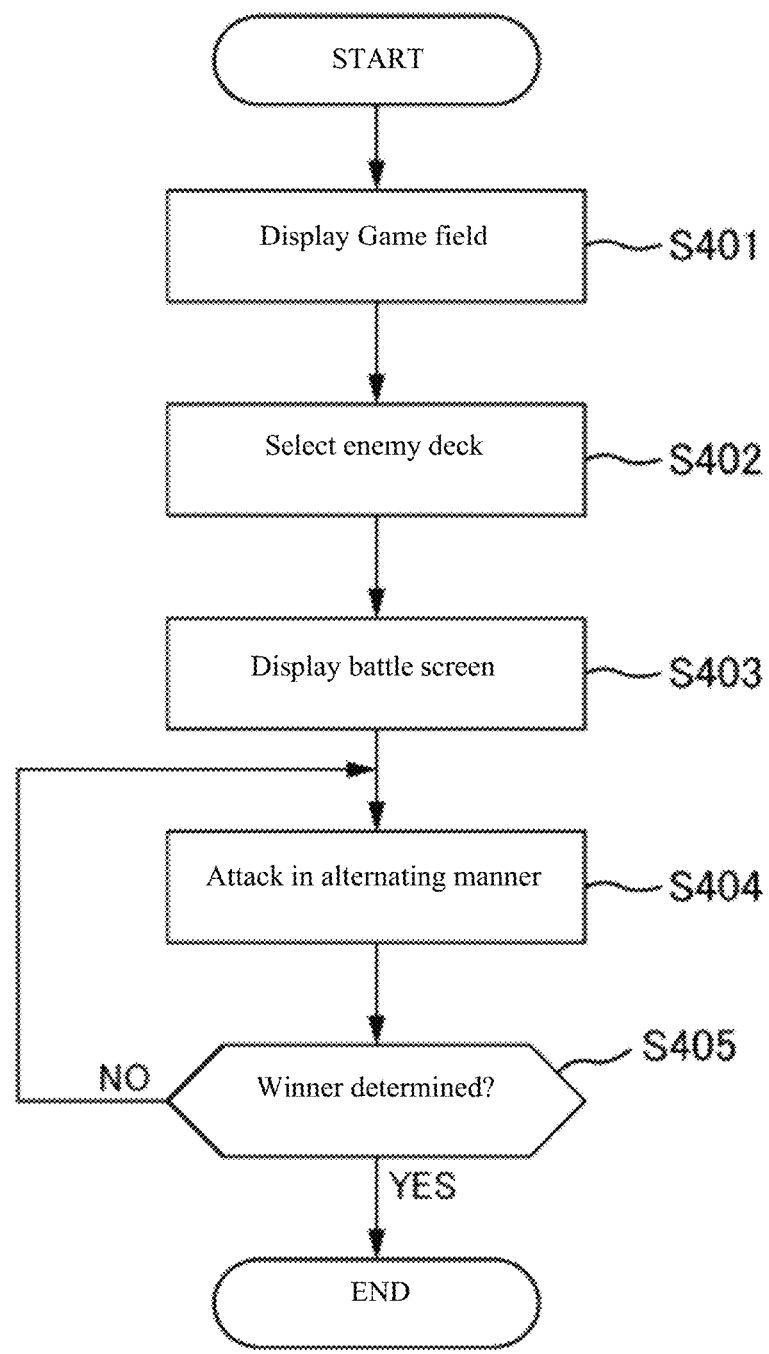
FIG. 16
A flow chart used to illustrate the second battle process.

FIG. 16 is a flow chart used to illustrate the second battle process.

First, when a rental deck is selected by the player on the game screen 70, which includes the deck list illustrated in FIG. 15, the player terminal 20 directs the terminal display module 24 to display the game screen 50, which includes the game field illustrated in FIG. 11 (S401).

Next, when the game screen 50 illustrated in FIG. 11 is displayed on the terminal display module 24, the second deck selection processing module 211B allows the player to select an opponent enemy deck from the enemy decks 65B, 65C on the game field 51 (S402). Namely, when the player is engaged in battle using the rental deck, there is no need to move the deck to the unit areas 511F and 511C, where the enemy decks 65B, 65C are located, as is the case when using a player deck, and therefore a battle can be initiated instantly simply by choosing the enemy decks 65B, 65C on the game field.

Next, in response to the player's operations, the player terminal 20 directs the second screen generation processing module 213B to generate a game screen including a battle field for the rental deck and the enemy deck and display this game screen on the terminal display module 24 (S403). Specifically, the second screen generation processing module 213B uses the deck information illustrated in FIG. 6 to generate a game screen used to conduct battles between character cards constituting a rental deck (friend deck) and character cards constituting an enemy deck. It should be noted that the game screen that includes this battle field has the same screen configuration as the game screen 60 illustrated in FIG. 13.

Next, the second battle processing module 212B directs each of the rental characters and enemy characters to attack their respective opponents in an alternating manner (S404). At such time, the magnitude of the attack strength, etc. of each character is determined based on the card information illustrated in FIG. 3 or proprietary card information illustrated in FIG. 6.

Next, the second battle processing module 212B determines whether or not a winner has been determined by the mutual attacks between the rental characters and enemy characters (S405). The winner is determined based on who is the first to bring the opponent's hit point parameter below a predetermined value.

Then, if the winner has been determined (S405: YES), this process is terminated, and if the winner has not been determined (S405: NO), the procedure goes back to Step S404 and the mutual attack process is repeated.

After that, looking back at FIG. 14, once the winner in the battle of the rental deck and the enemy deck is determined in this manner, the process is terminated. It should be noted that when the above-described rental deck and the enemy deck are engaged in battle, the number of turns remaining is not reduced, as is the case when a player deck and an enemy deck are engaged in battle. Accordingly, using a rental deck enables the player to engage in battle with an enemy deck without reducing the number of turns and makes it possible for the player to adopt a broader strategy.

As described above, according to the game program of the present embodiment, the player terminal 20 is directed to execute a process in which a player deck selected on a game field by the player is moved on the game field in response to the player's operations and engages in battle with an enemy deck at the destination, and a process in which a rental deck selected from a deck list by the player is engaged in battle with an enemy deck on the game field without being moved on the game field. Accordingly, in comparison with a player deck, a battle using a rental deck allows for a battle with an enemy deck to be started instantly because the rental deck does not have to be moved on the game field. In other words, players can vary their tactics by challenging enemy decks to a battle using a player deck or challenging enemy decks to a battle using a rental deck. As a result, it becomes possible to provide enhanced strategic nuance in a rental-enabled battle game. In addition, when the player selects a rental deck from the deck list, rental deck selection is restricted depending on the frequency of selection of the rental decks. For this reason, the player can enjoy the battle game by creating and selecting strategies that take game situations into consideration, such as whether the player should challenge an opponent to a battle using a player deck or whether he should challenge the opponent to a battle using a rental deck, and, moreover, which rental deck to choose in the deck list, etc.

Other Embodiments

The foregoing embodiment was intended to assist in the understanding of the present invention and is not to be construed as limiting of the present invention. The present invention can be modified and improved without departing from its spirit. At the same time, the present invention includes equivalents thereto. In particular, the embodiments described below are also included in the present invention.
<Units>
Although the present embodiment described above has been discussed with reference to decks composed of multiple character cards as an example of "units", the present invention is not limited thereto. For example, a deck composed of just 1 character card or a single character itself may be considered as a unit.
<Predetermined Condition>
Although the present embodiment described above has been discussed with reference to the requirement that the frequency of selection of a friend deck as a rental deck should not exceed a predetermined frequency (for example, once a day) as an example of the predetermined condition required for authorizing rental deck selection (rental deck-related condition), the present invention is not limited thereto. For example, the condition may be related to the player (for example, the rental deck must be a friend deck, the player must have a predetermined number of game points (corresponding to a rental fee), the player must possess a predetermined number of skill points, etc.), or alternatively, the condition may be related to the game field (for example, a special game field that appears only during an event). In addition, this may be a combination of these such conditions.
<Deck List>
Although the present embodiment described above has been discussed with reference to a deck list produced by listing friend decks belonging to friend players as an example of rental decks, the present invention is not limited thereto. For example, this may be a deck list including special rental decks prepared in advance by the game developer, or it may be a deck list that includes decks belonging to players other than the friend players. In addition, this may be a combination of the above. This enables the player to use rental decks even if he does not have friends yet.

Also, for example, this may be a deck list including, respectively, friend decks of a level higher than that of the player deck (strong decks), friend decks of the same level as the player deck, and friend decks of a level lower than that of the player deck (weak decks) in a predetermined ratio. This enables the player to select rental decks in accordance with the strength of the enemy deck.

In addition, in the present embodiment described above, decks owned by other players specified by the player may be listed as rental decks. Specifically, the player terminal 20 may transmit player IDs, entered by the player, of other players to the server device 10. The server device 10 uses the player IDs to search for player information (see FIG. 4) and acquire the other players' deck information (see FIG. 6). The server device 10 then generates list information (see FIG. 8) by referring to the deck information. Then, based on this list information, the player terminal 20 displays a deck list on the game screen, thus making it possible to select the decks of the other players specified by the player from this deck list.
<Reward Provision>
Although the present embodiment as described above has been discussed with reference to a case in which the reward provision module awards game points as an example of rewards, the present invention is not limited thereto. For example, this may be items, parameters such as experience values, character cards, or the like.

Although the present embodiment described above has been discussed with reference to a case in which a reward is given to a friend player if a friend deck is selected as a rental deck by the player, the present invention is not limited thereto. For example, a reward may be given to the friend player if a friend deck is selected as a rental deck by the player and this friend deck also wins the battle with an enemy deck.
<Information Processing Device>
Although the game system 1 of the present embodiment described above has been discussed with reference to a case in which the player terminal 20, serving as an example of an information processing device, executes various types of information processing based on the game program (e.g., non-transitory computer readable medium having machine-executable instructions with which a computer having a storage and a hardware processor connected via a network to a terminal device operated by a player), the present invention is not limited thereto. For example, the server device 10 may be itself adapted to execute the various types of information processing mentioned above based on this game program. In addition, for example, a configuration may be used in which the server device 10 supports part of the information processing device functionality. In such a case, the server device 10 and player terminals 20 constitute an information processing device. It should be noted that the information processing device is an example of a computer.

DESCRIPTION OF THE REFERENCE NUMERALS

1 Game system
2 Network
10 Server device
11 Control module
12 Storage module
13 Input module
14 Display module
15 Communication module
20 Player terminal
21 Terminal control module
22 Terminal storage module 23 Terminal input module
24 Terminal display module
25 Terminal communication module
50 Game screen
51 Game field
52 Deck status display area
53 Number of turns remaining
60 Game screen
61A Player character
61B Player character
61C Enemy character
61D Enemy character
61F Player deck
62A Player character
62B Player character
62C Player character
65B Enemy deck
65C Enemy deck
70 Game screen
71 Control button
211 Deck selection processing module
211A First deck selection processing module
211B Second deck selection processing module
212 Battle processing module
212A First battle processing module
212B Second battle processing module
213 Screen generation processing module
213A First screen generation processing module
213B Second screen generation processing module
214 Reward provision unit
511A-511L Unit areas

The invention claimed is:

1. A non-transitory computer readable medium having machine-executable instructions with which a computer having a storage and a hardware processor connected via a network to a terminal device operated by a player is made to execute processing that directs the computer to conduct a battle game involving player units owned by the player and opponent enemy units that engage in battle while moving on a game field comprising a plurality of locations, wherein the instructions comprise:

generating a game screen including the game field, on which the player units and enemy units are located;

facilitating a selection of a player unit to be used in battle on the game field while the game field is displayed on the game screen;

after moving the selected player unit on the game field from a first location of the plurality of locations to a second location of the plurality of locations, engaging the player unit in battle with an enemy unit at the second location;

generating a game screen including a unit list providing a list view of rental units that the player can borrow;

facilitating a selection of a rental unit to be used in battle from the unit list while the unit list is displayed on the game screen;

providing a list view of friend units belonging to friend players associated with the player as rental units in the unit list, and restricting the selection of the friend units by the player based on a frequency of selection, with which the friend units have been selected;

authorizing the selection of the rental units by the player if a predetermined condition is met, the predetermined condition comprising, for selection of friend units as rental units, the selection being authorized for the frequency of selection falling below a threshold; and without moving the selected rental unit on the game field, engaging the rental unit in battle with an enemy unit located on the game field;

wherein the engaging the rental unit in the battle with the enemy unit located on the game field is conducted without reducing a number of turns of the player.

2. The non-transitory computer readable medium according to claim 1, wherein the predetermined condition is at least one condition selected from conditions related to the player, conditions related to the game field, and conditions related to the rental units.

3. The non-transitory computer readable medium according to claim 1, further comprising providing a reward to one or more of friend players who owns friend units selected as rental units.

4. The non-transitory computer readable medium of claim 1, wherein upon ending a turn by the player, assigning additional skill points to the player.

5. An information processing device for conducting a battle game involving player units owned by a player and opponent enemy units that engage in battle while moving on a game field comprising a plurality of locations, wherein said device comprises:

a processor, configured to:

generate a game screen including the game field, on which the player units and enemy units are located;

facilitate a selection of a player unit to be used in battle on the game field while the game field is displayed on the game screen;

after moving the player unit selected by the player on the game field in response to the player's operations from a first location of the plurality of locations to a second location of the plurality of locations, engages said player unit in battle with an enemy unit located at the second location;

generate a game screen including a unit list providing a list view of rental units that the player can borrow;

facilitate a selection of a rental unit to be used in battle from the unit list while the unit list is displayed on the game screen;

provide a list view of friend units belonging to friend players associated with the player as rental units in the unit list, and restricting the selection of the friend units by the player based on a frequency of selection, with which the friend units have been selected;

authorize the selection of the rental units by the player if a predetermined condition is met, the predetermined condition comprising, for selection of friend units as rental units, the selection being authorized for the frequency of selection falling below a threshold; and without moving the rental unit selected by the player on the game field, engages said rental unit in battle with an enemy unit located on the game field;

wherein the engaging the rental unit in the battle with the enemy unit located on the game field is conducted without reducing a number of turns of the player.

* * * * *